Jan. 1, 1957 H. E. FORDYCE 2,776,121
SECTIONAL COOLING TOWER HAVING INTERMEDIATE WATER
REDISTRIBUTION MEANS BETWEEN SECTIONS
Filed Feb. 17, 1954 2 Sheets-Sheet 2
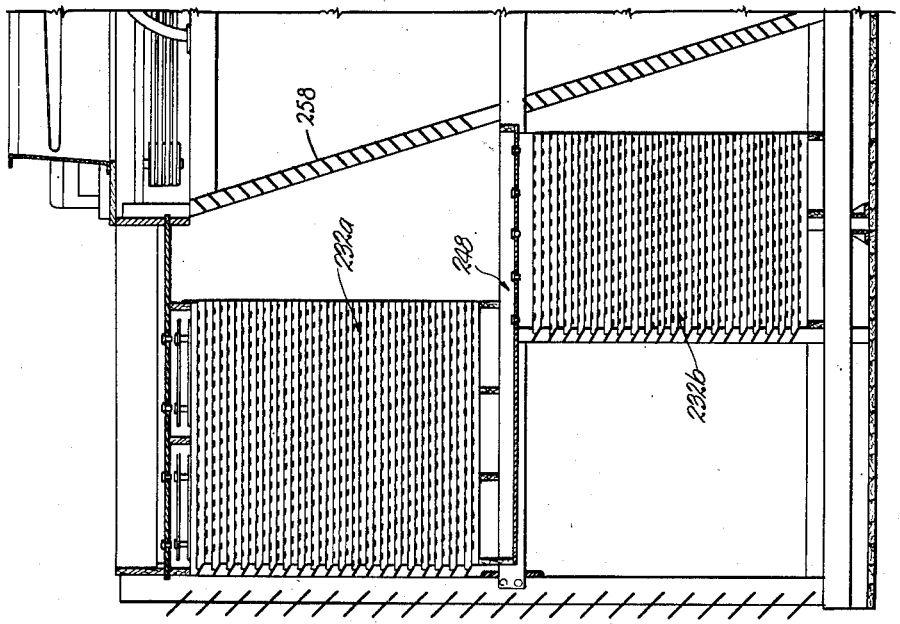
Fig. 3.
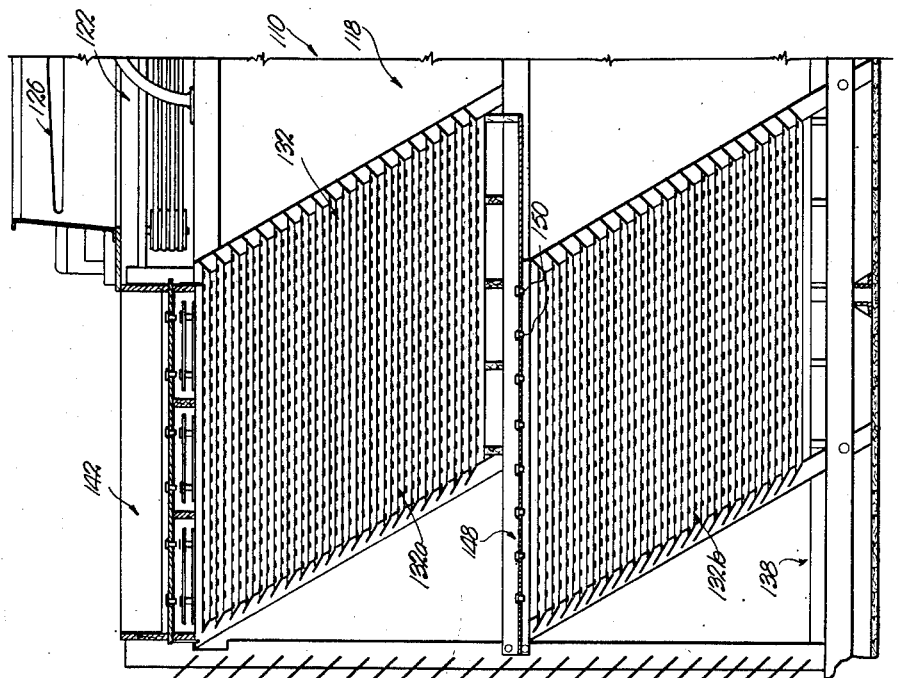
Fig. 2.
INVENTOR.
Homer E. Fordyce
BY 
ATTORNEY.

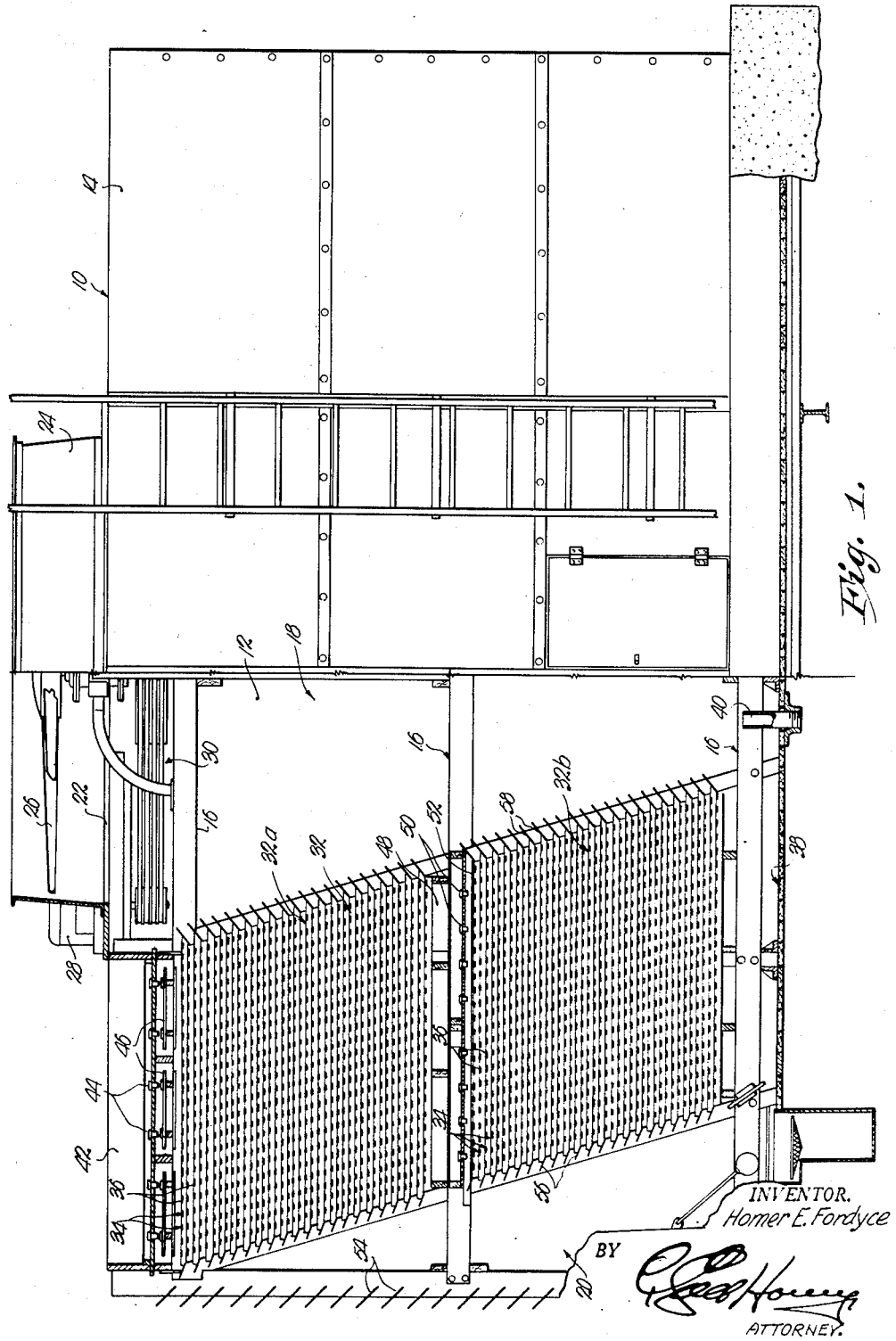

United States Patent Office 2,776,121
Patented Jan. 1, 1957

2,776,121

SECTIONAL COOLING TOWER HAVING INTERMEDIATE WATER REDISTRIBUTION MEANS BETWEEN SECTIONS

Homer E. Fordyce, Gashland, Mo., assignor to The Marley Company, Kansas City, Mo., a corporation of Delaware Application February 17, 1954, Serial No. 410,814

3 Claims. (Cl. 261—24)

This invention relates to cooling towers of the character wherein streams of water are broken into large numbers of globules and caused to pass downwardly through a filling of splash slats as currents of air are directed through the cooling tower and into contact with the wetted splash slats and water globules.

It is the primary object of the present invention to increase the thermal performance of water cooling towers of the aforementioned character by the provision of one or more redistribution basins to equalize distribution of the gravitating water both longitudinally and transversely as the same is being cooled.

It is the most important object of the instant invention to provide a water cooling tower capable of insuring proper distribution of the water as it is being cooled throughout the life of the tower regardless of the condition of the fill so far as state of disrepair is concerned.

It is an important object of the present invention to provide a unique fill assembly for water cooling towers including a plurality of horizontal splash decks arranged one above the other in spaced relationship and each including a number of spaced, horizontal splash slats offset relatively, the entire fill being disposed in a manner to make effective use of the entire fill notwithstanding the tendency of the water gravitating therethrough to drift toward the air discharge end of the tower as the lowermost end of the fill is approached.

Another important object of the present invention is to provide in a fill assembly of the aforementioned character, an intermediate water collection basin for redistributing the hot water to that section of the fill therebelow, thereby cooperating with the aforementioned disposition of the fill in equalizing distribution both horizontally and vertically notwithstanding the tendency of the gravitating water to drift toward the air discharge end of the tower.

Other objects include the way in which the fill is disposed so that the horizontal splash decks are in partial underlying relationship to the air discharge end of the tower; the manner in which the tower is sub-divided into a cooling chamber and a discharge chamber with the fill assembly disposed primarily in the cooling chamber but extending at its lowermost end into the discharge chamber; and the way in which the fill assembly is sub-divided into sections with the aforementioned redistribution means disposed horizontally between the sections and offset relative to a primary distribution basin at the uppermost end of the fill assembly.

In the drawings:

Figure 1 is a side elevational view of a sectional cooling tower having intermediate redistribution means between sections made pursuant to one form of the present invention, parts being broken away and in section to reveal details of construction.

Fig. 2 is a fragmentary, vertical cross-sectional view showing a modified form of the present invention; and Fig. 3 is a fragmentary, vertical, cross-sectional view showing another embodiment of the instant invention.

At the outset it may be pointed out that the form of cooling tower chosen for illustration of the improvements of this invention may be similar to that of U. S. Letters Patent Re. 21,794, in the name of L. T. Mart, which patent is owned by the assignee of the present applicaton.

Those familiar with the field to which this invention relates are well aware of the fact that, by virtue of the common use of materials subject to deterioration, because of being constantly subjected to the detrimental effects of moisture, the fill assemblies particularly, need considerable repair or replacement long prior to the end of the life of the tower as a whole. Such deteriorated condition has very drastic adverse effects on distribution of water as it is being cooled, thereby continually reducing thermal performance of the unit as the condition thereof becomes worse. Through use of the redistribution principles about to be set forth, uniform water distribution will be insured throughout the life of the tower notwithstanding the gradual depreciation of parts subject to wear and detrimental action of the water and moist conditions under which the tower must operate.

It is to be understood however, that while the cooling tower illustrated in the drawing is of a double-flow nature similar to the cooling tower of said patent, the principles about to be described may be adapted for use in towers having differing shapes and configurations.

Since the fill assemblies forming the subject matter of the present application are identical, only one has been shown in the embodiment of Fig. 1, operably mounted within a hollow casing broadly designated by the numeral 10. Casing 10 has a pair of spaced, vertical side walls 12 and 14 supported by suitable framework 16 presenting a central discharge chamber 18, and a pair of cooling chambers at the ends thereof, one only of which is illustrated and designated by the numeral 20.

The ends of the casing 10 are open for passage of air thereinto, and the discharge chamber 18 is provided with a hot air outlet 22 at the uppermost end thereof. A suitable fan ring 24 registering directly with the outlet 22 has a fan 26 rotatable therewithin. Fan 26 is driven by a prime mover 28 operably coupled with the fan 26 by belt and pulley means 30. Fan 26 is so disposed and formed as to draw cool air into the casing 10 at the open ends thereof, through the cooling chamber 20 and the discharge chamber 18 for discharge from the tower through opening 22 and ring 24.

Each of the cooling chambers 20 is provided with a fill assembly broadly designated by the numeral 32. Notable at the outset is the fact that the fill assembly 32 spans the distance between the side walls 12 and 14 and extends entirely from the uppermost end of the cooling chamber 20 to the lowermost end thereof. Likewise, as is clear in the drawing, the fill assembly 32 may be inclined and extend at an angle downwardly and inwardly from the uppermost end of the cooling chamber 20 and into the discharge chamber 18 so that the fill assembly 32 partially underlies the hot air outlet 22 of the casing 10.

Fill assemblies 32 are each composed of a plurality of horizontal, spaced cooling decks 34, each of which is in turn composed of a plurality of elongated, horizontal slats 36 arranged in spaced-relationship and extending between the walls 12 and 14.

It is noted that all of the slats 36 are offset relative to the slats therebelow and thereabove, to the end that hot water gravitating through the assembly 32 must take a serpentine path of travel and is thereby broken up into small globules that are acted upon by the cool air produced by the fan 26 and directed through the tower in the manner above set forth. Such disposition of the slats 36 likewise causes the hot water to film upon the horizontal and vertical surfaces of the slats 36, thereby rendering the cool air currents more effective in removing the heat from the hot water prior to gravitation thereof into an underlying sump 38.

The sump 38 is provided with one or more overflows 40 by way of which cool water may be directed to a point of use for subsequent circulation through the tower in any suitable manner, such as by use of spray nozzles or the like, or open top distribution basins overlying each assembly 32, one of which is shown and designated by the numeral 42. The bottom wall of the basin 42 is provided in any suitable manner, such as with a plurality of nozzles 44 through which the hot water drains to diffusion decks 46 between the basin 42 and the uppermost cooling deck 34.

The fill assembly 32 is sub-divided into two or more sections, such as an upper section 32a and a lower section 32b between which sections 32a and 32b is disposed a second open top basin 48 for collecting partially cooled water emanating from the upper section 32a and redistributing the same to the section 32b of fill assembly 32. The bottom of the basin 48 is provided with suitable distributing means such as a plurality of nozzles 50 and distribution decks similar to diffusion decks 46 may, if desired, be interposed between the basin 48 and the uppermost splash cooling deck 34 of the lower fill assembly section 32b.

The basins 42 and 48 are of substantially the same area as the decks 34 and are relatively offset horizontally so that the basin 48 is in partial underlying relationship to the discharge opening 22 whereas the basin 42 is above the cooling chamber 20 and defines the uppermost end thereof.

The open ends of the casing 10 may be provided with louvers 54 for minimizing the detrimental effect of prevailing winds upon the normal operation of the tower, and the fill assemblies 32 may be provided with inclined splash eliminators 56 at the inlet end thereof, together with inclined drift eliminators 58 at the outlet end thereof. The louver-like eliminators 56 and 58 extend the full distance between walls 12 and 14 and are in spaced parallelism as are the louvers 54. The eliminators 56 tend to prevent gravitating water from spilling and drifting from the fill assembly 32 to the sump 38 at the inlet end of the assembly 32, and by virtue of their inclinations, such water is constantly redirected into the assembly 32 for gravitation therein in the proper manner.

It is manifest that by virtue of the air movement through and between the louvers 54, thence between the louvers 56 and horizontally between the decks 34 for discharge into the chamber 18 through the eliminators 58, the gravitating streams and globules of water tend to drift inwardly toward the discharge chamber 18 under influence of the force of the currents of air. This tendency to drift, progressively increases as the lowermost end of the assembly 32 is approached, and therefore, by virtue of the inclination of the fill assembly 32, substantially in conformity with the inclination of drift, full use of the entire assembly 32 is made and all of the water must traverse the same before it falls into the underlying sump 38.

In other words, as soon as the water is discharged to the uppermost fill section 32a, the force of the incoming air tends to cause the gravitating streams of water and water globules, to drift inwardly and upwardly toward the discharge chamber 18 and the hot air outlet 22, and this tendency to drift progressively increases as the lowermost ends of the cooling chamber 20 and discharge chamber 18 are approached. Notwithstanding this fact, all of the water must fall upon each and every deck 34 before it can discharge into the sump 38 and therefore, longitudinal and transverse channeling is eliminated so that maximum use of the cool air is utilized to remove heat from the gravitating water.

In addition to the disposition of the fill assembly 32 so as to meet the problem of inefficiency because of the tendency of the water to drift, the intermediate basin 48 cooperates in assuring proper distribution of the water in the assembly 32. Rather than permit the water being cooled to drift toward the eliminators 58, and collect at the outlet end of the assembly 32, the water is collected by the basin 48 and redistributed to the underlying section 32b so that by the time it again tends to collect along the lowermost half of the eliminators 58, it will have traversed all of the lowermost decks 34 and fallen into the sump 38.

In some applications, it may be advantageous to relocate the path of falling water, and there is shown in Fig. 2 one form the invention may take in order to attain this result. In Fig. 2, casing 110 has a discharge chamber 118 provided with a hot air outlet 122 through which hot air is discharged by fan means 126.

A fill assembly 132 within the casing 110 is composed of a number of sections, there being an upper section 132a and a lower section 132b shown in Fig. 2. Means for discharging hot water to the uppermost splash decks is broadly designated by the numeral 142, and a suitable sump 138 is provided to receive the cooled water from the fill 132.

The sections 132a and 132b are shown inclined in Fig. 2 in much the same manner as in Fig. 1, but since the lowermost splash deck of section 132a need not necessarily be directly above the uppermost splash deck of section 132b as in Fig. 1, the sections 132a and 132b are shown relatively offset in Fig. 2. Thus, there is provided redistribution means such as a horizontal basin 148 between the sections, so disposed as to receive all of the partially cooled water gravitating from section 132a. Redistribution basin 148 is also disposed to redistribute all of the water thus received to the section 132b therebelow.

Notable in the form of the invention chosen for illustration in Fig. 2 is the fact that section 132a is in full overlying relationship to basin 148 and that section 132b is in full underlying relationship to basin 148. However, it is desirable that basin 148 completely underlie the lower splash deck of section 132a and completely overlie the upper splash deck of section 132b regardless of the extent of relative overlapping of the plurality of sections.

Basin 148 should of course, be provided with means to redistribute the water to the sections 132b, preferably over the entire area of the upper splash deck thereof. Use of a plurality of nozzles 150 in basin 148 provides for one satisfactory way of obtaining such equal and uniform redistribution.

Notable is the fact that in the form and disposition of parts in Fig. 2, all water emanating from the section 132a is collected by basin 148 and all water gravitating from section 132b is collected by sump 138 regardless of any drift or splash-over that may occur as the water gravitates and as the air intersects the path of travel of the water.

Fig. 3 of the drawings is illustrative of the fact that the principles of the present invention do not require the use of inclined fill sections or sections of equal cubical dimensions. Nor is it necessary that the sections have predetermined portions or any parts thereof in overlapping relationship. Further, while the splash slats of each section are of equal area, such is not essential to the primary objects of the invention.

In Fig. 3, upper fill section 232a and lower section 232b, are of differing overall dimensions and are again disposed so that an intermediate redistribution basin 248 relocates the path of falling water. The sections may be completely offset relatively and the basin 248 operates to collect the partially cooled water from section 232a, transfer it laterally from beneath section 232a to a position above section 232b, and redistribute the same evenly and uniformly to the section 232b for gravitation therethrough.

Manifestly, the differences in dimensions of the fill sections as shown in Fig. 3, as well as the elimination of the inclinations of one or both sections, may well be incorporated in the modifications of Figs. 1 and 2 if desired.

Similarly, a single drift eliminator 258, common to all sections of the fill assembly as shown in Fig. 3, may be used in the forms of the invention shown by Figs. 1 and 2 if desired and, conversely, each section 232a and 232b may have its own drift eliminator if such feature is to be incorporated in the tower. Such alternate construction may also be selected in the case of louvers at the air inlet end of the tower if the same are to be employed.

By collecting the gravitating water intermediate its path of travel at a point offset with respect to the original discharge thereof from one basin and carrying the same back laterally to a point where it is redistributed evenly over the uppermost deck of the section therebelow, the thermal performance of the unit is appreciably increased.

Accordingly, the disposition of the fill assembly, formation of the same through provision of a plurality of cooling decks, together with utilization of one or more intermediate redistributing basins, all cooperate to increase the efficiency of water cooling towers of this nature and, while details of construction may be varied within the spirit of the invention, it is desired to be limited only by the scope of the appended claims.

Having thus described the invention what is claimed as new and desired to be secured by Letters Patent is:

1. In a cross-flow, water cooling tower, a casing having opposed, vertical side walls, a bottom forming a catch basin, an open end for ingress of cool air throughout the entire area thereof, and an opening in the uppermost end of the casing for egress of hot air, thereby presenting a chamber between said open end and said opening; a sectional, cross-flow fill assembly spanning the distance between said sides and dividing the chamber into a discharge compartment adjacent the opening and a cooling compartment adjacent the open end, said assembly including a number of superimposed, horizontally offset, vertically inclined sections, each section including a plurality of vertically spaced cooling decks; means for forcing air into the casing from the open end to the cooling compartment, entirely through the fill assembly horizontally and through the discharge chamber, and thence through the opening; an open top, horizontal, primary hot water basin completely overlying the uppermost end of the upper section for discharging hot water onto said upper section for gravitational flow through the fill assembly in perpendicular, intersecting relationship to the flow of air through the fill assembly; and a single, open top, secondary basin between proximal sections having a bottom completely underlying the lowermost end of the fill section thereabove for receiving all the water emanating from the latter, and completely overlying the uppermost end of the adjacent fill section therebelow, said bottom being within a horizontal plane, that portion of said bottom overlying the section therebelow being provided with outlets for transferring all of the water from the section above the secondary basin laterally to the section below the secondary basin, thereby maintaining equal distribution of water throughout the fill assembly.

2. In a cross-flow, water cooling tower, a casing having opposed, vertical side walls, a bottom forming a catch basin, an open end for ingress of cool air throughout the entire area thereof, and an opening in the uppermost end of the casing for egress of hot air, thereby presenting a chamber between said open end and said opening; a sectional, cross-flow fill assembly spanning the distance between said sides and dividing the chamber into a discharge compartment adjacent the opening and a cooling compartment adjacent the open end, said assembly including a number of superimposed, horizontally offset, vertically inclined sections, each section including a plurality of vertically spaced cooling decks; means for forcing air into the casing from the open end to the cooling compartment, entirely through the fill assembly horizontally and through the discharge chamber, and thence through the opening; an open top, horizontal, primary hot water basin completely overlying the uppermost end of the upper section for discharging hot water onto said upper section for gravitational flow through the fill assembly in perpendicular, intersecting relationship to the flow of air through the fill assembly, the uppermost ends of the sections being vertically aligned with the primary basin; and a single, open top, secondary basin between proximal sections having a bottom completely underlying the lowermost end of the fill section thereabove for receiving all the water emanating from the latter, and completely overlying the uppermost end of the adjacent fill section therebelow, said bottom being within a horizontal plane, that portion of said bottom overlying the section therebelow being provided with outlets for transferring all of the water from the section above the secondary basin laterally to the section below the secondary basin, thereby maintaining equal distribution of water throughout the fill assembly.

3. In a cross-flow, water cooling tower, a casing having opposed, vertical side walls, a bottom forming a catch basin, an open end for ingress of cool air throughout the entire area thereof, and an opening in the uppermost end of the casing for egress of hot air, thereby presenting a chamber between said open end and said opening; a sectional, cross-flow fill assembly spanning the distance between said sides and dividing the chamber into a discharge compartment adjacent the opening and a cooling compartment adjacent the open end, said assembly including a number of superimposed, horizontally offset, vertically inclined sections, each section including a plurality of vertically spaced cooling decks; means for forcing air into the casing from the open end to the cooling compartment, entirely through the fill assembly horizontally and through the discharge chamber, and thence through the opening; an open top, horizontal, primary hot water basin completely overlying the uppermost end of the upper section for discharging hot water onto said upper section for gravitational flow through the fill assembly in perpendicular, intersecting relationship to the flow of air through the fill assembly, each section having an innermost and a lowermost triangular portion, said portion being vertically aligned and disposed beneath the opening; and a single, open top, secondary basin between proximal sections having a bottom completely underlying the lowermost end of the fill section thereabove for receiving all the water emanating from the latter, and completely overlying the uppermost end of the adjacent fill section therebelow, said bottom being within a horizontal plane, that portion of said bottom overlying the section therebelow being provided with outlets for transferring all of the water from the section above the secondary basin laterally to the section below the secondary basin, thereby maintaining equal distribution of water throughout the fill assembly.

References Cited in the file of this patent

UNITED STATES PATENTS

| | | |
|---|---|---|
| 1,334,515 | Braun | Mar. 23, 1920 |
| 1,928,904 | Mart | Oct. 3, 1933 |
| 1,929,410 | Coey | Oct. 10, 1933 |
| 2,350,590 | Coey | June 6, 1944 |
| 2,497,389 | Ahrens | Feb. 14, 1950 |
| 2,512,271 | Green | June 20, 1950 |